United States Patent [19]

Nir

[11] 4,332,105
[45] Jun. 1, 1982

[54] APPARATUS AND METHOD FOR PLANT GROWTH IN AEROPONIC CONDITIONS

[75] Inventor: Isaac Nir, Mazkeret Batya, Israel

[73] Assignee: ADI-Aeroponics Growth Ltd.

[21] Appl. No.: 950,261

[22] Filed: Oct. 10, 1978

Related U.S. Application Data

[63] Continuation-in-part of Ser. No. 814,980, Jul. 12, 1977, abandoned.

[30] Foreign Application Priority Data

Jul. 26, 1976 [IL] Israel ........................................ 50126
Oct. 10, 1977 [IL] Israel ........................................ 53084

[51] Int. Cl.³ .................... A01G 11/00; A01G 27/00; A01G 31/00
[52] U.S. Cl. ......................................... 47/1 R; 47/58; 47/59; 47/62; 47/79; 137/563; 239/63; 239/69; 239/70; 239/71; 239/75; 137/624.2; 137/624.18
[58] Field of Search ..................... 47/1, 17, 18, 59-65, 47/81, 82, 2, 58, 79; 239/310, 318, 373, 426, 433, 434, 499, 505, 507, 512, 513, 514, 515, 520, 63, 69, 70, 71, 75; 137/624.18, 624.2, 563, 567

[56] References Cited

U.S. PATENT DOCUMENTS

| | | | |
|---|---|---|---|
| 1,181,145 | 5/1916 | Larson | 239/513 |
| 1,915,884 | 6/1933 | Gericke | 47/62 |
| 2,062,755 | 12/1936 | Lyons et al. | 47/62 |
| 2,150,257 | 3/1939 | Windandy | 47/18 |
| 2,152,254 | 3/1939 | Hansen | 47/59 |
| 2,244,686 | 6/1941 | Garrison et al. | 137/563 X |
| 2,411,681 | 11/1946 | Egli | 137/256 X |
| 2,431,890 | 12/1947 | Raines | 47/59 |
| 2,928,211 | 3/1960 | Martin | 47/61 |
| 2,952,096 | 9/1960 | Hughes et al. | 47/60 |
| 3,123,304 | 3/1964 | Sutton | 47/2 |
| 3,305,968 | 2/1967 | Dosedla | 47/62 |
| 3,352,057 | 11/1967 | Ferrand | 47/64 |
| 3,424,231 | 1/1969 | Truhan | 47/17 X |
| 3,478,817 | 11/1969 | Shaw | 47/17 X |
| 3,578,245 | 5/1971 | Brock | 239/68 X |
| 3,667,157 | 6/1972 | Longhini | 47/59 |
| 3,768,201 | 10/1973 | Yoo | 47/61 X |
| 3,892,982 | 7/1975 | Holmes | 47/62 |
| 3,915,384 | 10/1975 | Diggs | 47/2 |
| 3,951,339 | 4/1976 | Dufresne | 239/66 |
| 4,004,612 | 1/1977 | Hummel et al. | 239/69 |
| 4,035,950 | 7/1977 | Anselm | 47/59 |
| 4,057,933 | 11/1977 | Enyeart | 47/62 X |
| 4,059,922 | 11/1977 | Digiacinto | 47/82 |
| 4,075,785 | 2/1978 | Jones | 47/62 |
| 4,107,875 | 8/1978 | Bordine | 47/62 |

FOREIGN PATENT DOCUMENTS

| | | | |
|---|---|---|---|
| 922106 | 3/1973 | Canada | 47/64 |
| 64338 | 11/1955 | France | 239/434 |
| 308715 | 9/1971 | U.S.S.R. | 47/62 |

OTHER PUBLICATIONS

Laurie, Alex et al., (1969), "Subirrigation", *Commercial Flower Forcing*, Pub. McGraw–Hill Book Company, pp. 113 and 114 only.

Primary Examiner—James R. Feyrer
Attorney, Agent, or Firm—Browdy and Neimark

[57] ABSTRACT

Apparatus for aeroponic growth and development of a multiplicity of plants comprising at least one plant development unit including at least one perforate plant support member adapted to secure plants above the root portions thereof and thereby to directly expose substantially all of the root portions thereof to the atmosphere; spraying apparatus for providing a nutrient mist directly to the exposed root portions of the plants; and nutrient collection and recirculation means; and control means for determining the timing of mist provision.

4 Claims, 13 Drawing Figures

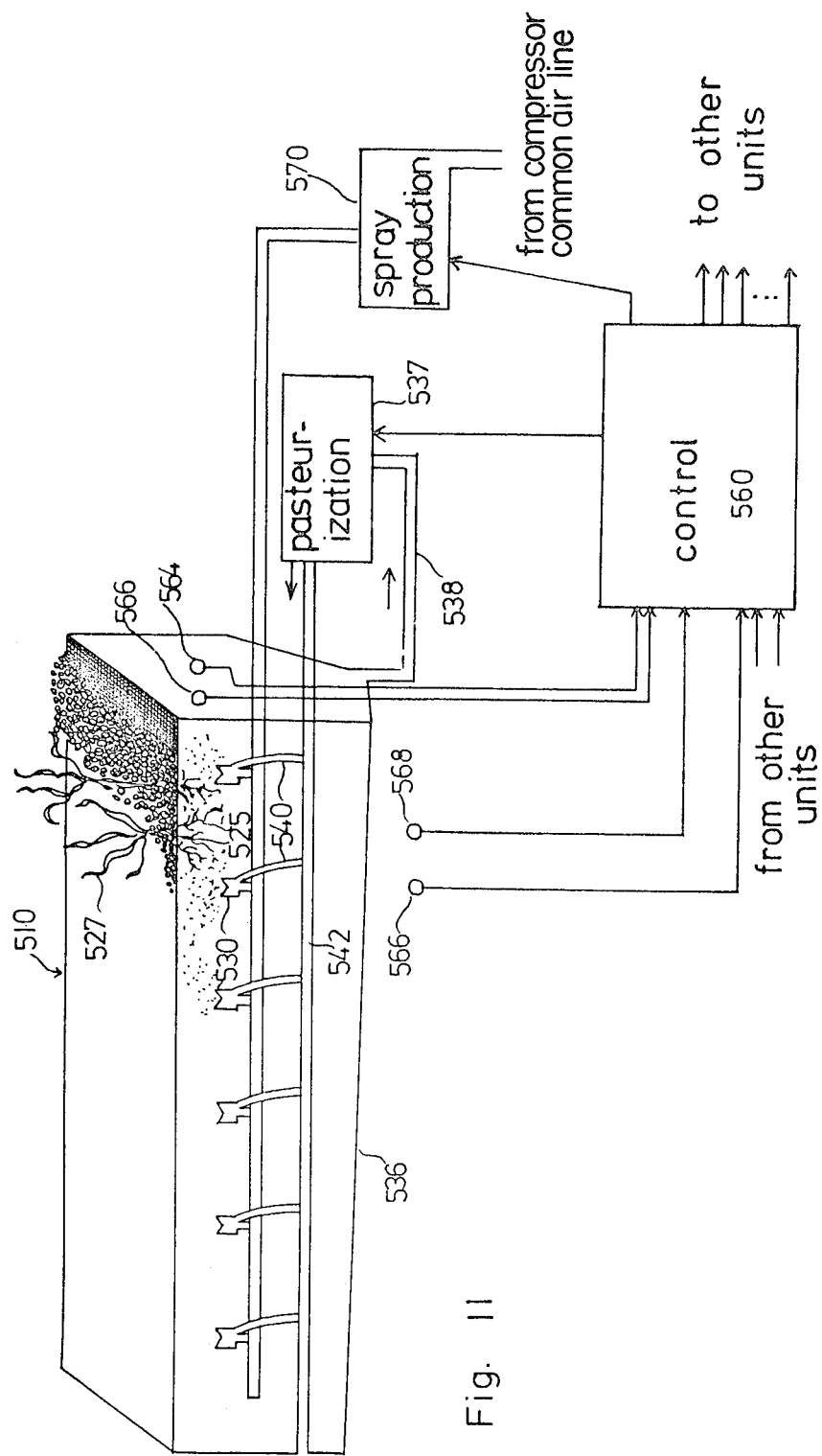

APPARATUS AND METHOD FOR PLANT GROWTH IN AEROPONIC CONDITIONS

This is a continuation-in-part of U.S. Pat. application Ser. No. 814,980, now abandoned filed July 12, 1977.

FIELD OF THE INVENTION

The present invention relates to horticulture and more particularly to the growth and development of plants, especially the root portions thereof, in a generally gaseous environment into which a nutrient-containing mist is introduced.

BACKGROUND OF THE INVENTION

Aeroponics, or the growth of plants in air has been known for some time. F. W. Went describes experimental apparatus for growing plant roots in a vaporized nutrient in a publication entitled "The Experimental Control of Plant Growth" (1957) Chronica Botanica Co. Waltham, Mass. at pages 81-83. Even earlier, in a publication entitled "A Method of Growing Plants in Water Vapor to Facilitate Examination of Roots", Phytopathology Volume 32 pages 623-625, 1942, W. A. Carter described apparatus for growing plants with their roots in water vapor. More recently, in an article entitled "Method for Growing Plants Aeroponically", in Plant Physiology (1976) Vol. 57, pages 344-346, Zobel et al describe an experimental growing box employing a rotating spinner for mist generation.

The above publications, extending over more than 30 years, all relate to experimental devices designed to permit examination and relatively free access to plant roots for treatment, all within a research context. Aeroponics, until the present, has been confined to the laboratory and has not been conceived of or developed heretofore as a commercial technique for facilitating and enhancing plant growth and development.

A number of cogent reasons why plants should be grown commercially outside of a soil environment have long existed. A major problem particularly in the growth of flowers are diseases which reach the plant via the soil. For example, bacteria such as Fussarium, present in certain soils, causes disease in Carnation plants. Other examples of plant diseases which arise from soil contact are Botrytis, Sclerotium, Verticilium and Rhizoctonia. Further difficulties connected with soil borne diseases are the difficulty of diagnosing and treating the plants and particularly the root portions thereof due to the relative inaccessibility thereof in the soil.

Other difficulties arise in connection with plants which require special and specific treatment to enhance their growth.

For example, in the case of orchids, it has been found desirable to supply certain hormones to the growing plants in order to enhance their development. The application of such hormones to such plants in a soil environment is rendered difficult and relatively expensive due to the relatively large quantity of material required, arising from the fact that such hormones must be administered indirectly, via the soil.

Hydroponics, or the growth of plants in water, has been known for some time and has been the subject of much experimental investigation. Hydroponics has not however achieved acceptance for commercial scale plant growth and development. One problem often involved in hydroponics is the lack of adequate ventilation at the roots due to the substantially continuous presence of water thereabout.

Hydroponic plant growth apparatus employing a liquid spray has been proposed in the patent literature. U.S. Pat. No. 4,059,922 discloses a sprayer hydroponic grower in which potted plants are mounted on a supporting frame defining a spray enclosure. The pots are apertured to permit the spray to wet the root portions of the plants and to provide nutrients thereto. The roots of the plants are supported within the pots by a porous medium such as peat and thus the majority of the roots are not directly exposed to the atmosphere and to the spray. As a result of the retention of moisture by the porous medium, spray is provided only two or three times during a 24 hour period. The fact that the roots are in the main not directly exposed to the atmosphere is believed to have negative implications with regard to root diseases.

U.S. Pat. No. 2,431,890 discloses a method and receptacle for propagating plants and relates particularly to cuttings to which a spray of water is applied to facilitate the development of roots.

U.S. Pat. No. 3,768,201 discloses a method of sprouting beans which employs a water spray which is governed by a timer. The beans to be sprouted are disposed in a container having an apertured bottom for draining and the water is recirculated.

German Offenlegungsschrift No. 2,351,508 describes a plant growing method in which plants are matured from seed which is placed in a porous root permeable base. As the plant develops, the roots extend outwardly of the root permeable base. The base is mounted on a support frame such that the base and the exterior roots are exposed to a liquid spray. The porous root permeable base shares the apparent disadvantages of the pots of U.S. Pat. No. 4,059,922, in that a portion of the roots is not exposed to the atmosphere and to the spray and thus becomes susceptible to root disease.

SUMMARY OF THE INVENTION

The present invention seeks to overcome difficulties associated with the growth and development of plants in accordance with conventional techniques and in accordance with the proposals found in the patent literature and to provide apparatus and methods for commercial scale growth and development of plants with substantially all of their roots in a gaseous environment.

There is thus provided in accordance with an embodiment of the invention apparatus for aeroponic growth and development of a multiplicity of plants comprising at least one perforate plant development unit including at least one perforate plant support member adapted to secure plants above the root portions thereof and thereby to directly expose substantially all of the root portions to the atmosphere; spraying collection and recirculation apparatus for providing a nutrient mist directly to the root portions; and comprising control apparatus for determining the timing and duration of mist provision.

Further in accordance with an embodiment of the invention, the control apparatus is operative in response to sensed environmental conditions in the vicinity of the growing plants, to govern the timing of mist provision.

The mist provision apparatus may be driven by a liquid pump or alternatively may comprise a relatively low pressure pneumatic sprayer operating as a venturi pump. This latter arrangement has the advantage that it enables a central compressor to be employed to service a number of development units, while at the same time isolating the liquid flows in the units to inhibit the possible spread of disease.

Additionally, the nutrient liquid may be pasteurized to inhibit disease and may be maintained at an elevated temperature so as to enable it to be used to regulate the temperature inside the growth units.

In accordance with one embodiment of the invention, there is provided a generally gas-tight enclosure substantially surrounding at least the root portions of the plants and apparatus for introducing a desired gaseous atmosphere to the enclosure.

A plurality of plant development units may be associated with a single control apparatus for sequentially effecting mist generation in a plurality of enclosures according to a preselected program.

Also in accordance with an embodiment of the invention here is provided portable aeroponic plant growth and development apparatus especially suitable for the development of seeds, seedlings or cuttings and comprising; a support member formed of generally coplanar spaced sheets of screen material, and a drainage tray for collecting fluid from mist provided in an aeroponic unit and arranged to removably support the support member in spaced relationship thereto.

Further in accordance with an embodiment of the invention, the support member may be transported and stored in an operating movable aeroponic growth unit, such that the plants may be maintained and their growth and development continued during storage and transport and up to the time of utilization thereof.

The aeroponic apparatus described hereinabove may be supplemented by placing the plants entirely in a sealed environment and introducing a selected treatment agent in gaseous form into the sealed environment for treatment of the plants.

The plant supporting member may conveniently be a perforated layer of plastic foam material which directly receives the plants.

Also in accordance with an embodiment of the invention there is provided mist producing apparatus comprising:

a supply conduit having at least one outlet permitting the exit of a pressurized flow of liquid; and a shoulder member arranged adjacent said at least one outlet in a selectably adjustable position such that said pressurized flow of liquid impinges on a portion of said shoulder member of desired angular orientation, for deflection of said pressurized flow of liquid at a desired angle.

Further in accordance with an embodiment of the invention there is provided apparatus for governing the temperature in aeroponic growth and development apparatus comprising:

means for sensing the ambient temperature in an aeroponic growth environment; and means for heating a nutrient fluid to be sprayed in said aeroponic growth environment in response to the sensed ambient temperature.

The temperature governing apparatus may also comprise means for spraying the heated nutrient fluid at times determined by the sensed ambient temperature.

Additionally in accordance with an embodiment of the invention apparatus is provided for governing the humidity in an aeroponic growth environment comprising:

means for sensing the ambient humidity in an aeroponic growth environment; and means for governing the spraying of a nutrient fluid in said aeroponic environment in response to the sensed ambient humidity.

Additionally in accordance with an embodiment of the invention there is provided a nutrient concentrate forming the base solution for a nutrient spray suitable for use in aeroponic applications and comprising: (in units of weight per hundred liters of concentrate)

| | | |
|---|---|---|
| a. | $Ca(NO_3)_2 \cdot 4H_2O$ | 29.50 Kg. |
| | sequestren | 3.47 Kg. |
| b. | $KNO_3$ | 10.136 Kg. |
| | $NH_4NO_3$ | 2.529 Kg. |
| | $KH_2PO_4$ | 3.425 Kg. |
| | $MgSO_4 \cdot 7H_2O$ | 12.665 Kg. |
| | $ZnSO_4$ | 6.00 g. |
| | $MnSO_4$ | 39.05 g. |
| | $CuSO_4$ | 2.06 g. |
| | $H_3BO_3$ | 74.00 g. |
| | $MoO_3 \cdot H_2O$ | 0.42 g. |

Further in accordance with an embodiment of the invention there is provided a method of increasing the fruit yield of plants comprising the step of:

applying a solution of a substance which induces the initiation and development of flowers and fruit set to the plants at a time after the plants have developed the potential capability of supporting the development and ripening of the fruit.

The inducing solution, according to a preferred embodiment of the invention contains (2-chloroethyl)-trimethyl ammonium chloride.

The invention will be more fully understood and appreciated from the following detailed description taken in conjunction with the drawings in which.

Figure 9:
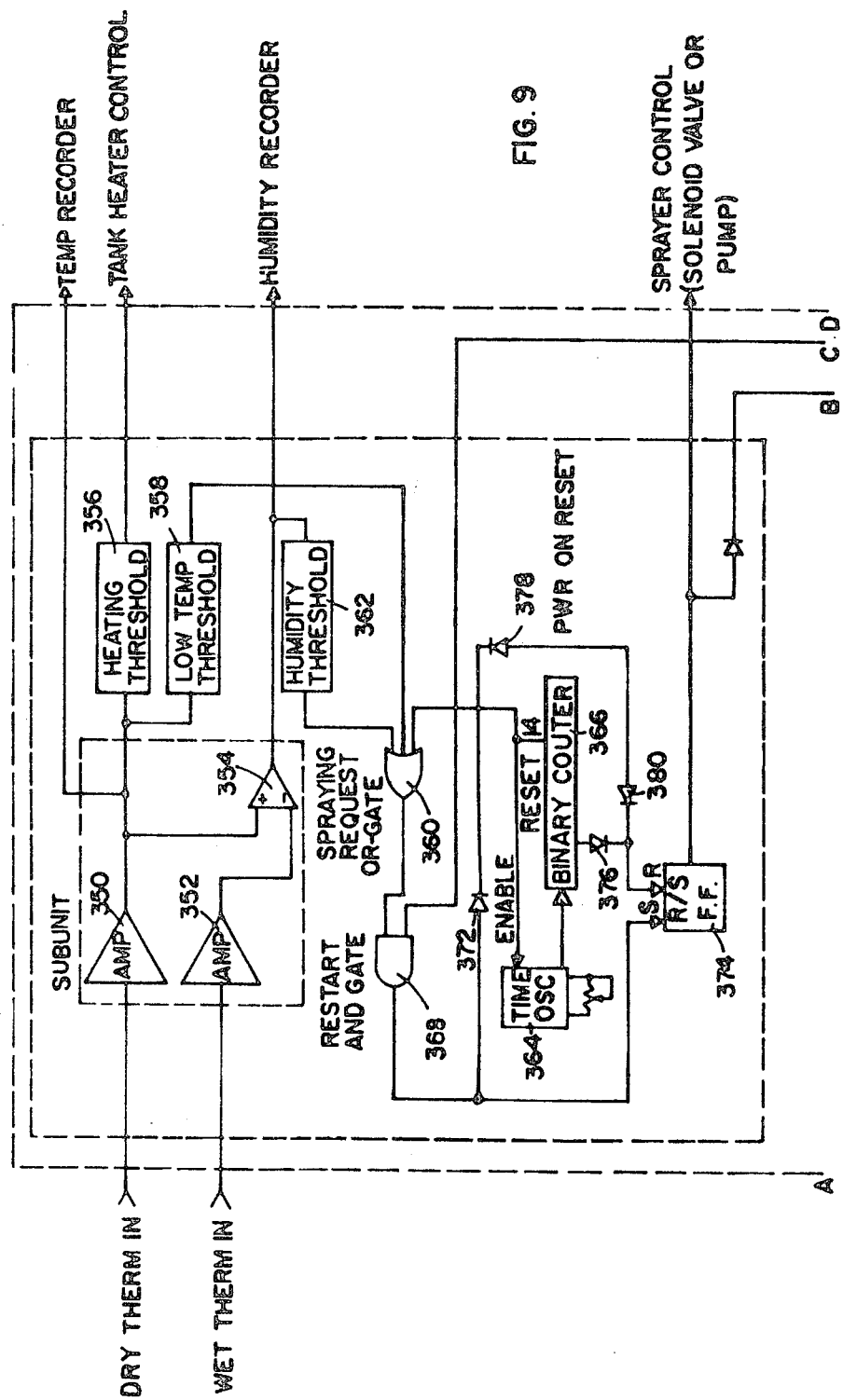
Figure 9:
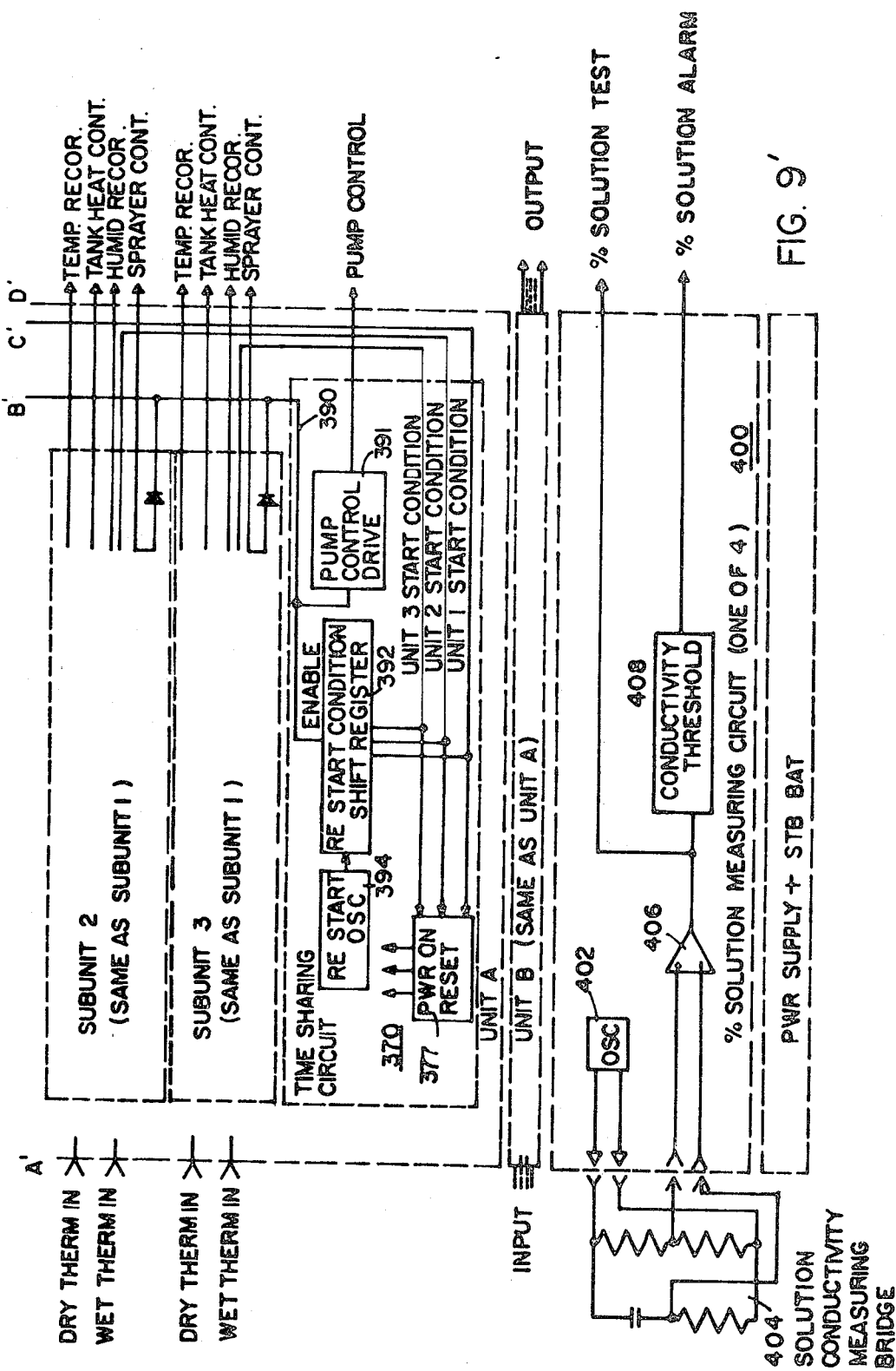
Figure 10:
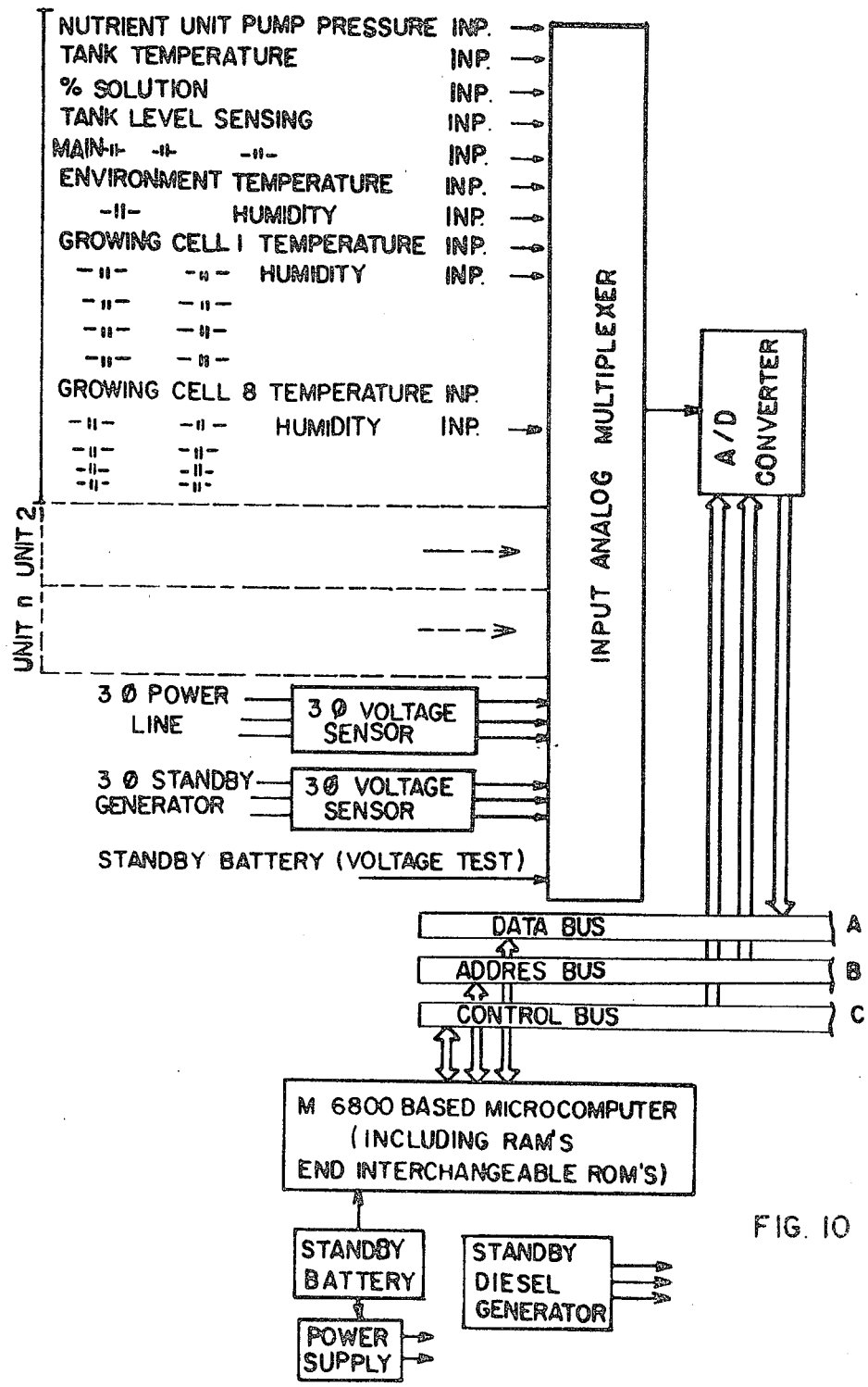
Figure 10:
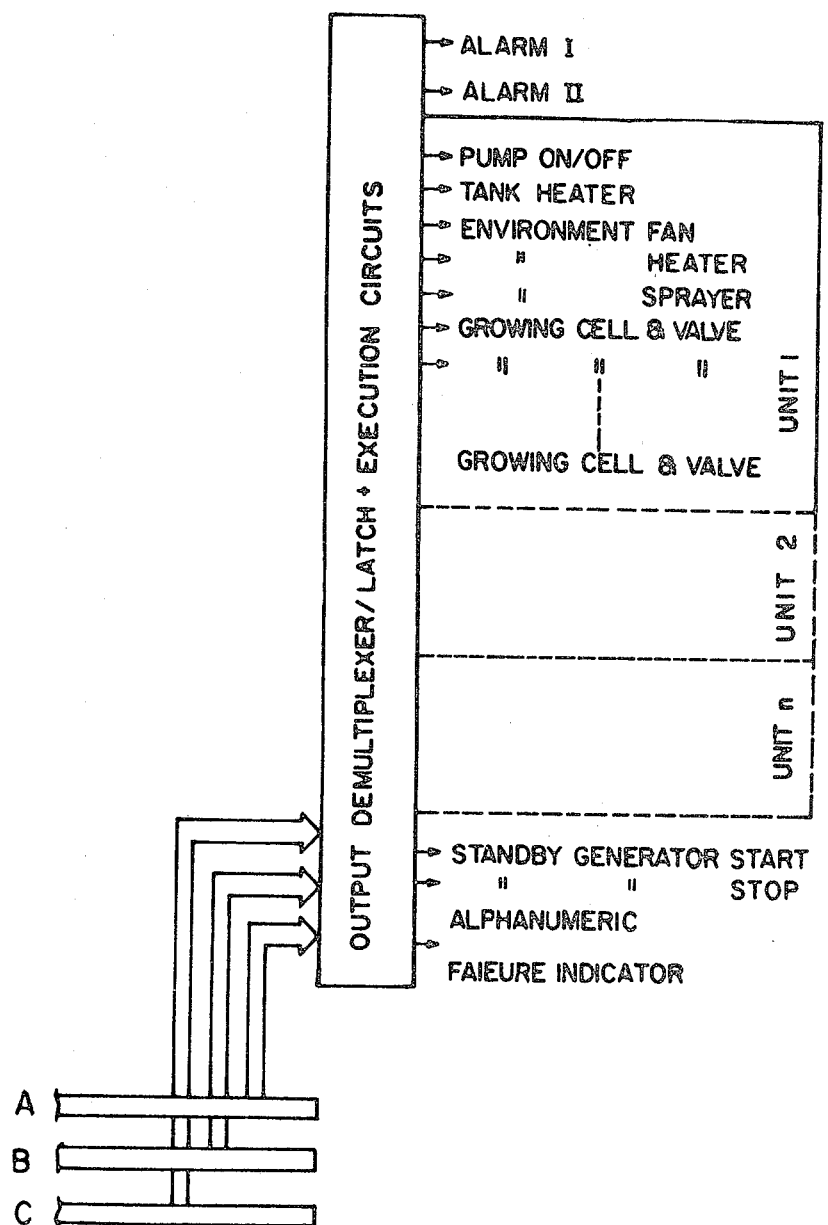

FIGS. 9 and 9' is a schematic illustration of spray control circuitry constructed and operative in accordance with an embodiment of the invention;

FIGS. 10 and 10' is a schematic illustration of an alternative embodiment of control circuitry; and FIG. 11 is a schematic illustration of a further embodiment of the invention

DETAILED DESCRIPTION OF THE INVENTION

Figure 1:
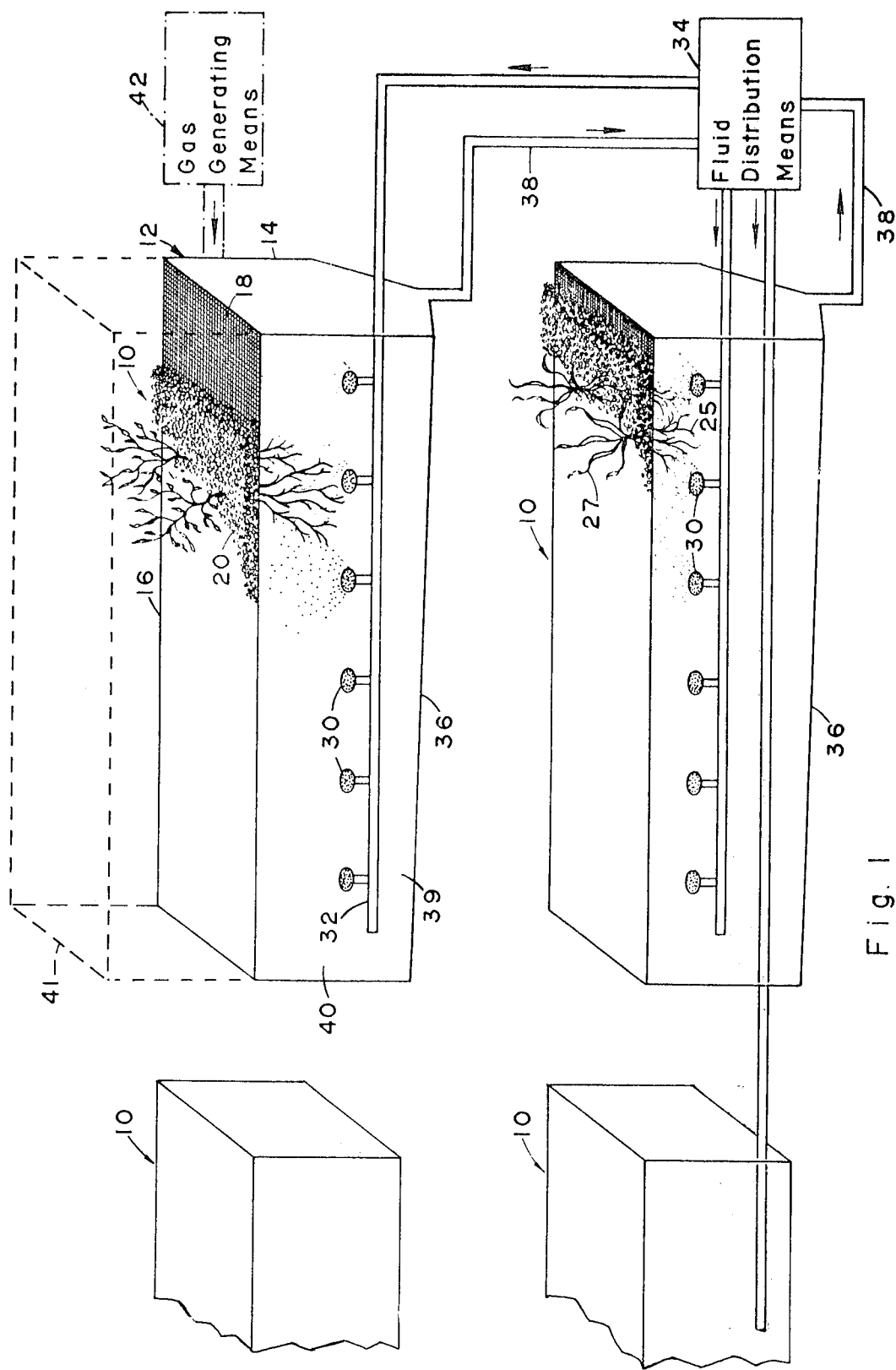
FIG. 1 is a pictorial illustration of a commercial aeroponic growth and development system constructed and operative in accordance with an embodiment of the present invention.

Referring now to FIG. 1, there is shown in partly pictorial, partly schematic illustration an aeroponic plant growth and development system constructed and operative in accordance with an embodiment of the invention.

A plurality of aeroponic growth and development units indicated generally by reference numeral 10 are disposed typically alongside each other and one above another within a building structure (not shown) which is designed to provide a desired degree of control over the temperature, humidity and light environment therein. The horizontal spacing between the growth and development units need only be sufficient to permit an operator to casually pass therebetween when tending the plants and is typically 50 cms. while the vertical spacing between the growth and development units is determined by the amount of space required for plant growth as well as the particular conditions of natural illumination required. Thus, the vertical spacing may be as little as 40 cms. between adjacent plant surfaces. It is noted that the growing surface of the units may either be flat or inclined, with a view towards the most efficient use of solar illumination. Alternatively, artificial light may be employed either in combination with or instead of natural illumination. Typically the top surfaces of the growth and development units are separated from each other by a distance of 2 meters. However, this distance may vary greatly and may be as low as 40 cms. for root development of Carnation cuttings.

It is appreciated that any number of growth and development units may be disposed one on top of the other with suitable spacing therebetween, the number of such units in a stack being limited only by the structural and logistical considerations involved. Thus, it will be understood that the intensivity of plant growth per unit area of available land is virtually unlimited other than by economic factors.

Growth and development units 10 are generally rectangular and comprise a support frame 12 having legs 14 and a peripheral supporting structure 16 mounted thereon. Disposed on structure 16 is a plant support member 18 typically a screen formed of a plastics material and having openings in dimension 0.7 cms. by 0.7 cms. Above the plastics material there is provided inert particulate material such as foam polystyrene, volcanic ballast, vermiculite, peat or small gauge gravel. This material is employed to further support the plants and to maintain a desired orientation thereof in relation to the surface defined by screen 18. The use of such material permits the plants to be arranged in a manner such that only the collar above the root portions thereof contact the inert material such that good ventilation is provided in order to reduce problems of pests and diseases.

In accordance with an alternative embodiment of the invention, plant support member 18 may comprise a sheet of plastic foam, such as polystyrene, apertured at suitable intervals to receive plants for support thereof.

The root portions 25 of respective plants 27 are disposed below the surface screen 18 and within a volume which is defined generally by the peripheral legs 14 of units 10. Substantially all of the roots are thus exposed to the atmosphere.

Disposed adjacent the root portions 25 are a series of mist generating units 30 which are disposed in a generally linear array and coupled for fluid communication with a fluid supply line 32. Fluid supply lines 32 of the respective units 10 are coupled in turn to fluid distribution means 34 which will be described hereinafter in greater detail.

Disposed below mist generating means 30 and substantially covering the bottom surface of units 10 is a drain surface member 36, typically a plastic sheet which is arranged, configured and disposed so as to act as a drain for fluid emitted by mist generators 30 and falling by action of gravity onto drain surfaces 36. Drain surfaces 36 are in turn connnected with conduits 38 to fluid distribution means 34 to permit recycling of the nutrient containing fluid.

Mist generating means 30 typically comprise sprayers of the Naan or Lego brands manufactured in Israel and having a capacity of approximately 15-30 liters per hour. Frame 12 is typically formed of wood covered with a plastic coating to prevent damage thereto from the circulating fluids.

It is appreciated that in accordance with an alternative embodiment of the invention, support frames 12, instead of being fixed structures as illustrated in FIG. 1 may be sliding structures akin to drawers and may be disposed in a support member akin to a drawer cabinet. In such an embodiment the plant support member may be advantageously removably mountable on the sliding frame and the mist generation sprayer may either be mounted on the support frame or alternatively a series of such sprayers may be arranged between successive drawers or rows of drawers so as to provide desired wetting of the root portions of the plants disposed therein.

According to an alternative embodiment of the invention each plant support member 18 disposed on a sliding drawer type frame could be associated with its own drainage surface 36. As a further alternative a single drainage surface 36 underlying a plurality of respectively vertically stacked plant support members may be employed.

In accordance with a preferred embodiment of the invention wall sections of polyethylene sheeting are disposed peripherally of frame 12 so as to extend generally between surface 18 and drainage surface surface 36. Wall sections 38 thus define together with surface 36 and screen 18 an enclosure 40 within which the root development takes place. Thus in accordance with a preferred embodiment of the invention mist generating means 30 are operative to substantially fill enclosure 40 with a nutrient containing mist of selected composition at specified times and for selectable specified durations.

Wall portions 36 are generally designed so as to be readily movable, permitting an operator to readily gain access to plant roots for examination or treatment thereof.

According to one embodiment of the invention wall sections 36 are joined to drainage surface 36 and to the periphery of screen 18 in a generally gas sealed arrangement thus permitting the temperature and humidity of the environment within enclosure 40 to be controlled. Further according to this embodiment of the invention gas generating means 42 may be provided for substantially filling enclosure 40 with a desired gaseous atmosphere. The gas generating means 42 may comprise a container of pressurized gas or typically a chemical or other gas generator together with a blower.

The desired gaseous atmosphere may be carbon dioxide and oxygen in a controlled proportion selected to correspond to the optimal mixture for the development of a given type of plant.

Alternatively, a fertilizer such as ammonia in gaseous form or a hormone such as ethylene also in gaseous form may be applied to the plant for selected treatment thereof. Other types of plant treatment agents in gaseous form may similarly be employed.

In accordance with an embodiment of the invention the generally gas-tight enclosure may encompass also the top portion of the plants as indicated in phantom by the enclosure structure 41. As a alternative only the top portions of the plants may be enclosed in a gas-tight enclosure while the root portions thereof may be left open to the atmosphere.

Wall portion 39 and drainage surface 36 may be formed either of a transparent or translucent plastics material or alternatively of a generally opaque plastics material depending on whether it is desired that root development take place in a generally light or generally dark environment. Alternatively wall portions 39 and drain surface 36 may be formed of any other suitable materials having any suitable light transmissivity.

In a further alternative, wall portions 39 may be eliminated and drainage surface 36 may be replaced by any other suitable fluid control means.

Figure 2:
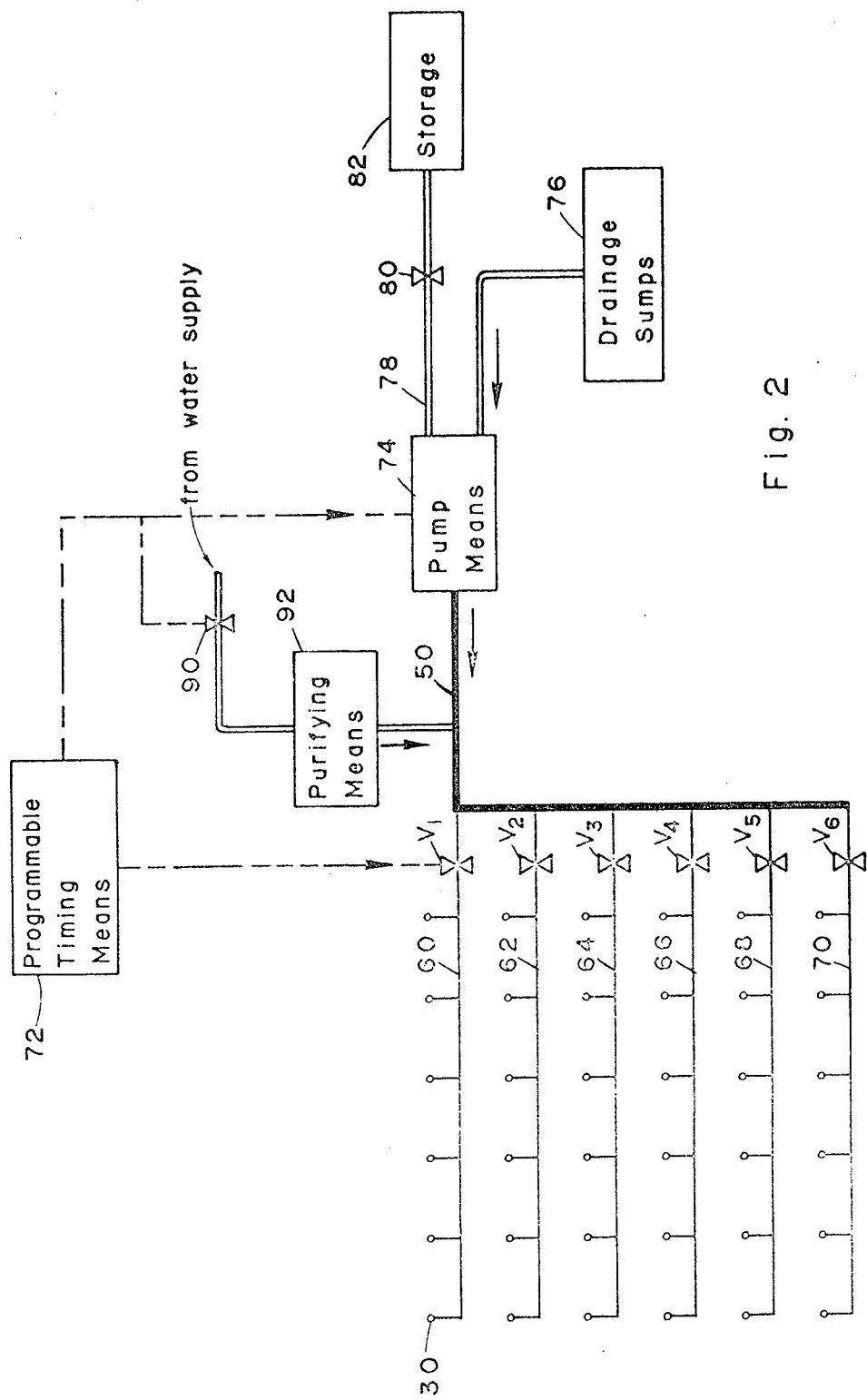
FIG. 2 is a schematic illustration of the nutrient containing mist generation and recirculation system constructed and operative in accordance with an embodiment of the invention.

Referring now to FIG. 2 there is shown in schematic form the fluid circulation system of the embodiment of the invention shown in FIG. 1 including fluid distribution means 34 and the electrical control system therefor.

A main supply conduit 50 is coupled to branch supply lines 60, 62, 64, 66, 68 and 70 each corresponding to a single growth and development unit 10 (FIG. 1) and coupled to respective mist generators 30, via respective conventional magnetically operated valves V1, V2, V3, V4, V5 and V6 which are in turn controlled by programmable timing means 72 for automatic operation. The fluid circulated in the system herein considered, is generally water based and comprises a nutrient mixture selected to correspond to the particular needs of the plants being grown at a particular time. The mixture may also comprise hormones or other treatment substances for enhancing growth and development or preventing disease.

Fluid is supplied into conduit 50 from pump means 74 which may be one or more conventional pumps operated in response to control signals from programmable timing means 72. Programmable timing means 72 and pump means 74 typically operate on line power. In accordance with a preferred embodiment of the invention, an emergency backup battery system may also be provided. Preferably, pump means 74 operates at a relatively low pressure thereby to enhance operating lifetime of the pumps and of the remainder of the fluid circulation system. Pump 74 receives fluid mainly from drainage sumps 76 in which is collected fluid drainage from the respective growth and development units 10 as described below in connection with FIG. 1. One or more drainage sumps may be provided and arranged in accordance with particular design criteria. Initial supply and replenishment of circulating fluid is provided via a conduit 78 and valve 80 from a storage tank 82 which holds nutrient containing fluid. Valve 80 may either be automatically controlled or alternatively manually controlled. This valve is opened when it is necessary to add additional fluid to the circulating system.

Figure 3:
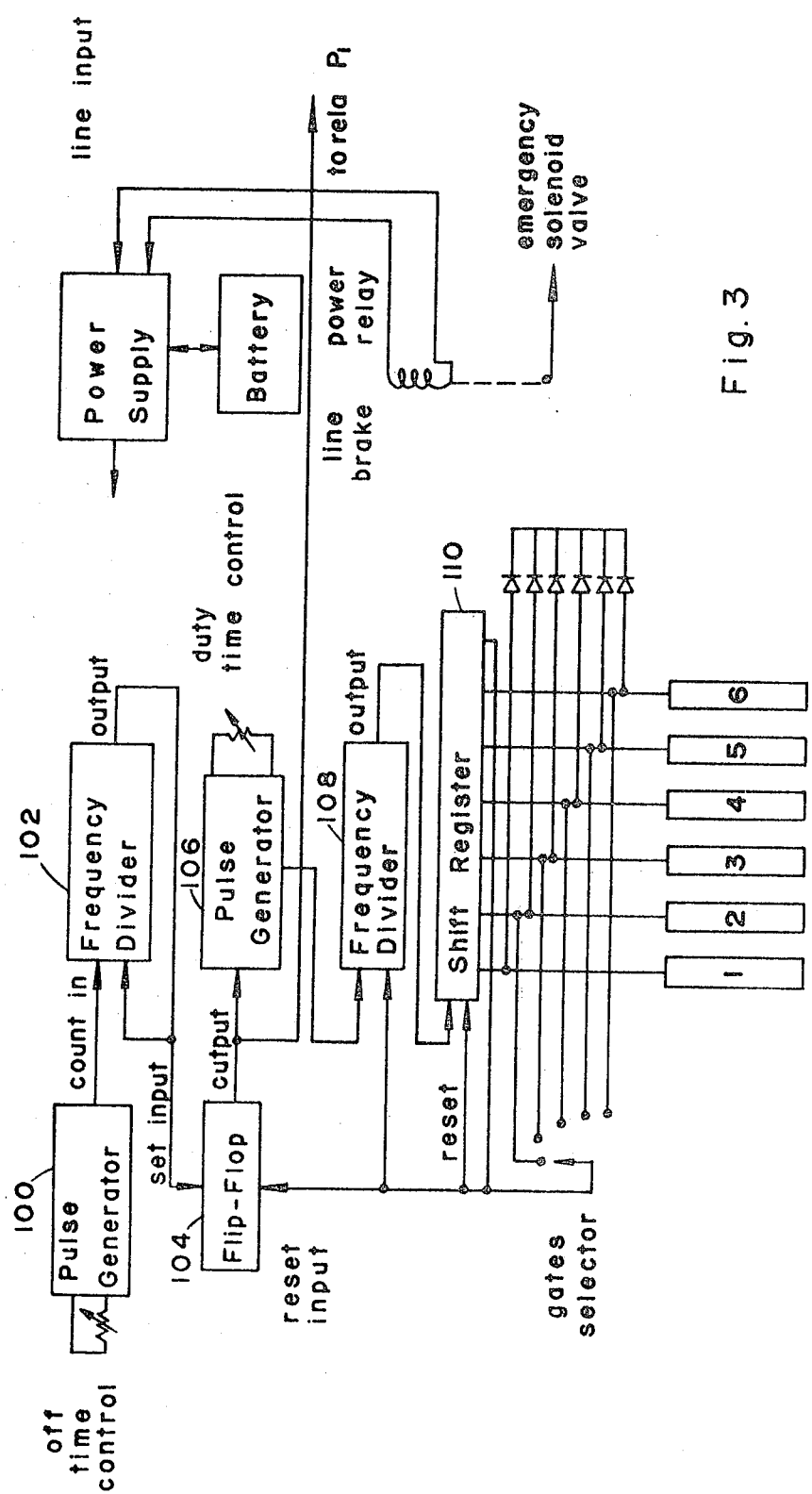
FIG. 3 is a schematic illustration of the control circuitry constructed and operative in accordance with an embodiment of the invention.

An alternative source of fluid is provided from a conventional pressurized water supply such as that provided by many municipalities and local authorities via a valve 90 and purifying means 92 which may include a filter and ion exchange apparatus. Valve 90 opens in the event of an electrical power failure (i.e. the failure of the line power and of a backup battery power) which could prevent the proper operation of pump means 74 and programmable timing means 72 and ensures that in the event of the failure of either the pump means or the programmable timing means an adequate supply of fluid is provided via conduit 50 for mist generation. In this connection it should be appreciated that valves V1-V6 are designed to remain open in the event of a power failure affecting their performance. Programmable timing means 72 is illustrated in block diagram form illustrated in FIG. 3 and comprises a pulse generator 100 which supplies a stream of periodic pulses to a frequency divider 102. The output of frequency divider 102 is supplied as a set input to a flip flop 104 which in turn provides an enable output to a pulse generator 106 whose output in turn governs the duty time, that is the duration of operation of a given valve and thus the duration of mist generation in a given growth and development unit. Pulse generator 106 provides a stream of periodic pulses to a frequency divider 108 whose output in turn is supplied to a shift register 110. Shift register 110 in turn provides a reset output to flip flop 104, frequency divider 108 and to an internal reset of shift register 110 itself. The outputs of shift register 110 serve as enable inputs to respective solenoids 1-6 which operate respective valves V1-V6.

Frequency divider 102 also provides an output to a relay P1 which governs the operation of pump means 74 (FIG. 2).

Figure 4:
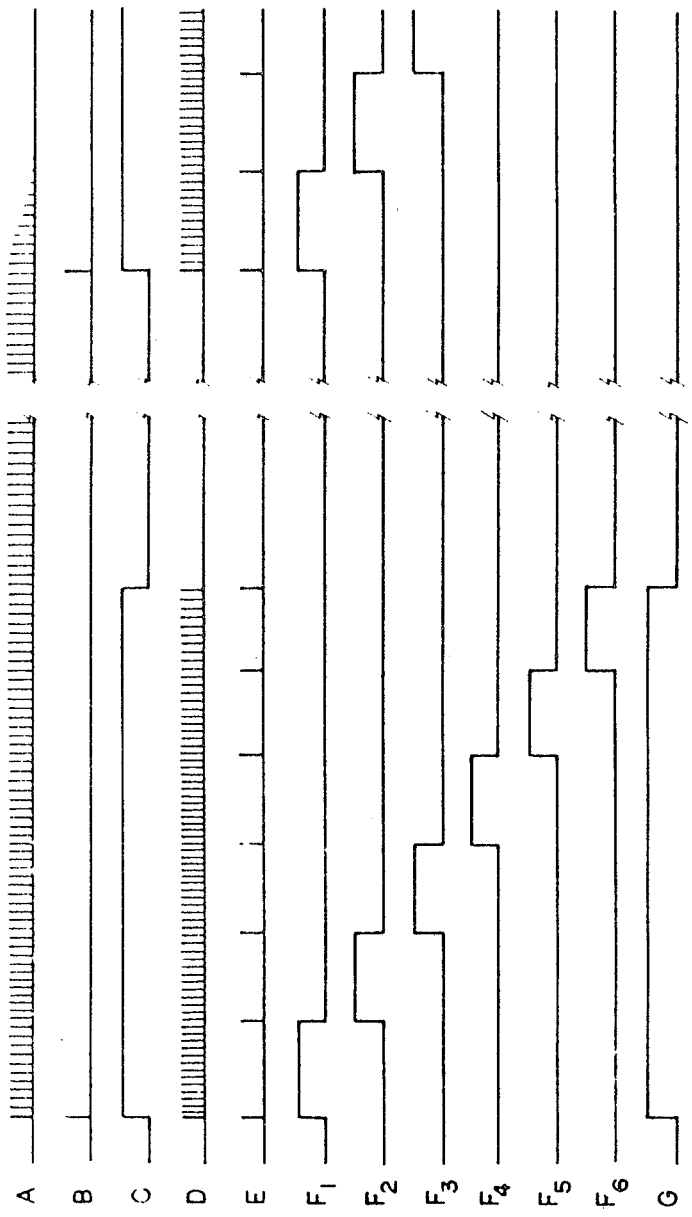
FIG. 4 is a sequence diagram illustrating the operation of the apparatus constructed and operative in accordance with a preferred embodiment of the invention.

The cycle of operation of programmable timing means 72 may be better appreciated by reference additionally to FIG. 4 which indicates the sequence of operation of the control apparatus. Line A indicates the outputs of pulse generator 100 which are continuous during the entire time the system is in operation and line B indicates the triggering output of frequency divider 102 which places flip flop 104 in the set state. Line C indicates the set output of flip flop 104 which causes pulse generator 106 to produce a chain of pulses illustrated at line D. Line E indicates the output of frequency divider 108 which, when supplied to shift to register 110, sequentially energises solenoids 1-6 for a predetermined amount of time. Subsequent to the energization of solenoid 6 the reset output of shift register 110 causes flip flop 104 to return to the set state, thus terminating for the time being the generation of pulses by pulse generator 106 and terminating the duty time of pump means 74 as illustrated at line G.

A particular feature of the present invention is the relative simplicity of the electrical and electronic apparatus comprising programmable timing means 72.

Due to the appreciation that this apparatus is designed for the use of persons not expert in electronics or the maintenance of electronic apparatus, the apparatus is designed in modular form with push-pull type connectors which permit spare modulii, kept on hand for emergencies, to be readily and immediately substituted for malfunctioning modulii in the system without requiring skill on the part of the operators or tools.

Figure 5:
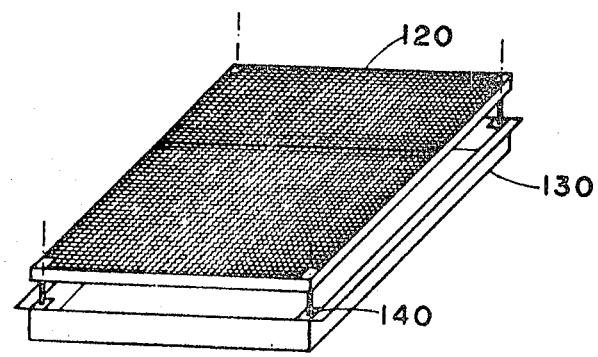
FIG. 5 is a schematic illustration of a portable aeroponic growing unit constructed and operative in accordance with an embodiment of the invention.

Reference is now made to FIG. 5 which illustrates portable apparatus for the growth and development of seeds, seedlings or cuttings and for the transport storage and marketing of the finished products. A generally planar sandwich is formed of one or two sheets of plastic coated metal screen having 1 cm square openings.

Very high densities of approximately 10,000 cuttings per square meter may be supported in the sandwich. The support structure defined by the sandwich and containing the seed, seedlings or cuttings may initially be introduced into a container of IBA Indole butylic acid powder for initiation of root growth. The support sandwich 120 may then be transferred to an aeroponic growth and development unit 10 which is substantially identical to the unit illustrated in FIG. 1 except that the screen assembly 18 and particulate matter 20 is not present, sandwich 120 being substituted therefor. Aeroponic growth and development is then allowed to continue for a suitable time typically approximately three weeks and support member 120 containing the thus developed plants may be removed from unit 10 and suspended a desired distance above a generally planar water containing tray 130 by means of support members 140 which may be associated with the tray. The vertical space for separation between support sandwich 120 and tray 130 is selected to permit the roots of the plants supported by sandwich 120 to reach a sustaining fluid contained in tray 130 and to be nourished thereby during transport and subsequent storage until transplantation of the plants. It is appreciated that the combination of support sandwich 120 and tray 130 as a transportation, storage and marketing device has a number of advantages. Primary among these is the possibility of transporting such plants over relatively long distances by relatively slow means of transport to distant markets. Similarly plants may be sustained for a relatively long time in cold storage to await favourable market conditions. Thirdly, plants may be provided with nourishment until the time of actual use, thus greatly simplifying distribution and planting procedures. The condition of the roots can readily be inspected by interested parties at any stage of transport or storage as well as at the point of sale.

Figure 6:
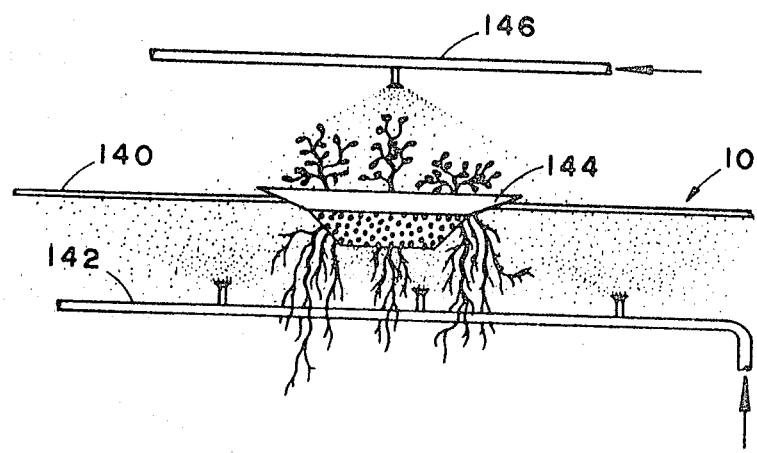
FIG. 6 is a pictorial illustration of an aeroponic growing system employing the movable seed containers.

Referring now to FIG. 6 there is shown in schematic form an aeroponic growth and development unit essentially designed for the germination and development of plants from seeds and subsequent transport and marketing of the thus developed plants. A perforate support member 40 is disposed above mist generating means 142. A plurality of seed containing dishes 144 are disposed at the perforations of support 140 such that the lower portion of containers 144 lies within the mist generating range of means 142. Containers 144 are generally dish-shaped having the lower portion thereof perforated to permit roots developed therein to exit therefrom. One or a plurality of seeds is conveniently placed in container 144 together with a germination enhancing substance such as Gibberalic Acid $GrA_3$ and its contents are then subjected to a mist generated from below. Preferably a spray of nutrient containing fluid is also directed at the contents of container 144 from above by sprayer means 146. Upon development of roots the spray from means 146 may be discontinued and upon completion of the desired development, containers 144 may be removed from units 10. The plants developed therein may be transported, stored and marketed in the original containers or placed directly in correspondingly sized flower pots. For this purpose fluid containing apparatus (not shown) similar to trays 130 in FIG. 5 may be employed.

Figure 7:
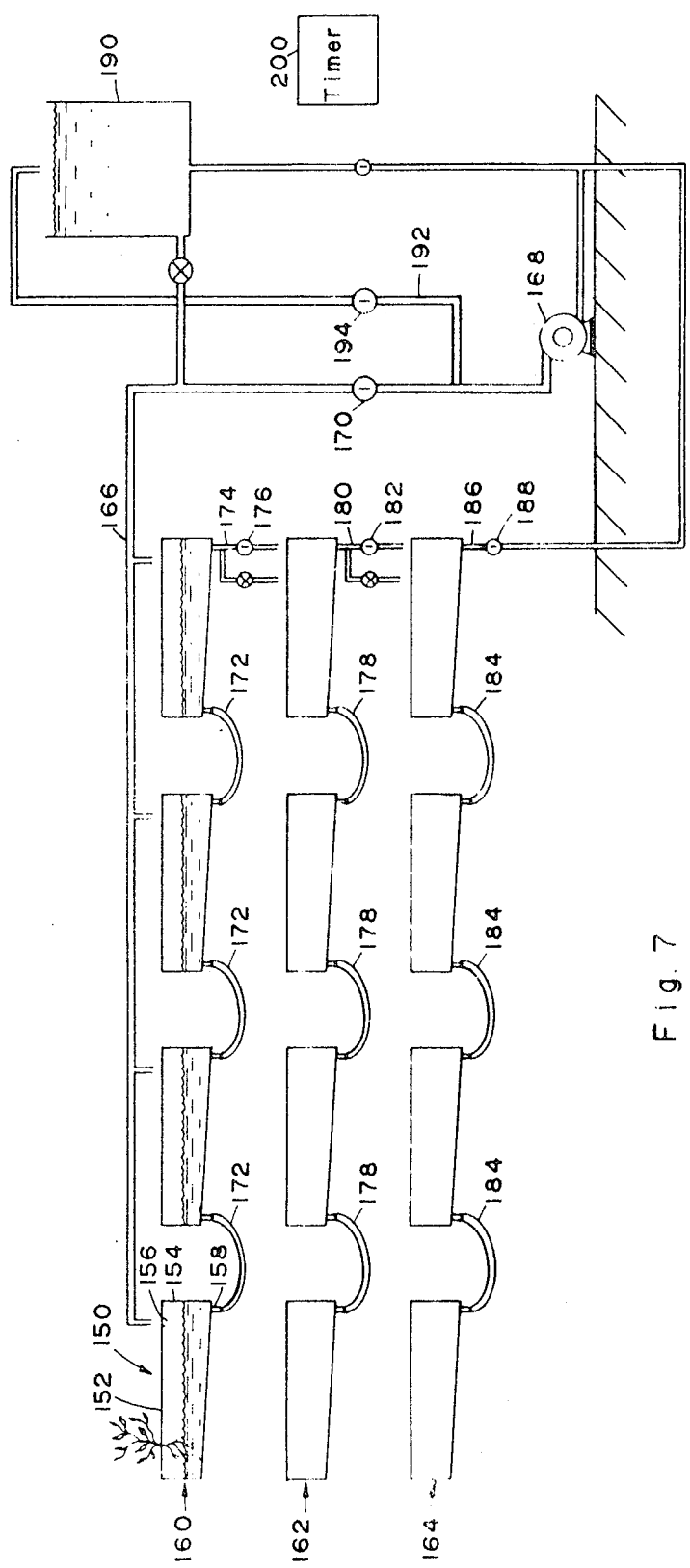
FIG. 7 is a schematic illustration of a hydroponic/aeroponic growth and development system constructed and operative in accordance with an embodiment of the invention.

Referring now to FIG. 7 there is shown apparatus for hydroponic-aeroponic growth and development of plants comprising a plurality of plant growth and development units 150, each comprising a plant support member 152, typically a screen, and a liquid container 154 having a liquid inlet 156 and a liquid outlet 158.

In accordance with a preferred embodiment of the invention, plant growth and development units 150 are arranged to define first, second and third pluralities of units 150 hereinafter referred to by reference numerals 160, 162 and 164 each arranged at a different height so as to permit flow of liquid from a first plurality of growth and development units 160 by means of gravity to a second plurality of such units 162 and then to a third plurality of such units 164.

Nutrient containing liquid is supplied to first plurality 160 via a manifold 166 which in turn receives the liquid from a pump 168 via an electro-magnetically controlled valve 170.

Units 150 of first plurality 160 are interconnected by liquid conduits 172. Drainage from units 150 of first plurality 160 is effected via a fluid channel 174 governed by an electro-magnetically controlled valve 176. The liquid drained via channel 174 is typically supplied to units 150 of second plurality 162 by means of gravity and distributed between the various units by means of communication conduits 178. Similarly, drainage from second plurality 162 is effected by gravity via a channel 180 governed by electro-magnetically controlled valve 182 and the fluid thus drained is supplied to third plurality 164, the units thereof being interconnected by communication channels 184.

Drainage from third plurality 164 is effected via a channel 186 controlled by an electro-magnetic valve 188 and the fluid drained is resupplied to the first plurality 160 of unit 150 via manifold 166 and valve 170 or alternatively returned to a storage container 190 via a channel 192 governed by an electro-magnetically controlled valve 194.

The operation of the various electro-magnetically controlled valves is governed by timer means 200 which may comprise conventional programmable control apparatus.

Operation of the hydroponic-aeroponic system described hereinafter will now be summarized. In order to overcome a serious disadvantage of hydroponics which concerns the lack of ventilation of the root portions of plants lying in nutrient containing fluid, the fluid is supplied only at predetermined intervals and not continuously so as to permit ventilation of the roots in the absence of the surrounding fluid. Thus, in response to timer control signals, nutrient containing fluid is supplied to first plurality 160 and fills the units 150 thereof up to a predetermined level. After a predetermined duration of time also determined by timer 200 most or all of the fluid in unit 150 is drained via valve 156 and passes to the second plurality 162 and thence to the third plurality.

A certain amount of nutrient containing liquid may be retained under certain circumstances continuously in units 150 to prevent drying out of the roots. The duration and periodicity of the presence or absence of nutrient containing liquid at the roots of plants is determined in advance and forms the basis for the programming of timer 200 as well as the configuration of the apparatus. It is appreciated that once liquid has been supplied to the first plurality 160, pump 168 may be disengaged while the remainder of the circulation cycle takes place by gravity.

Figure 8:
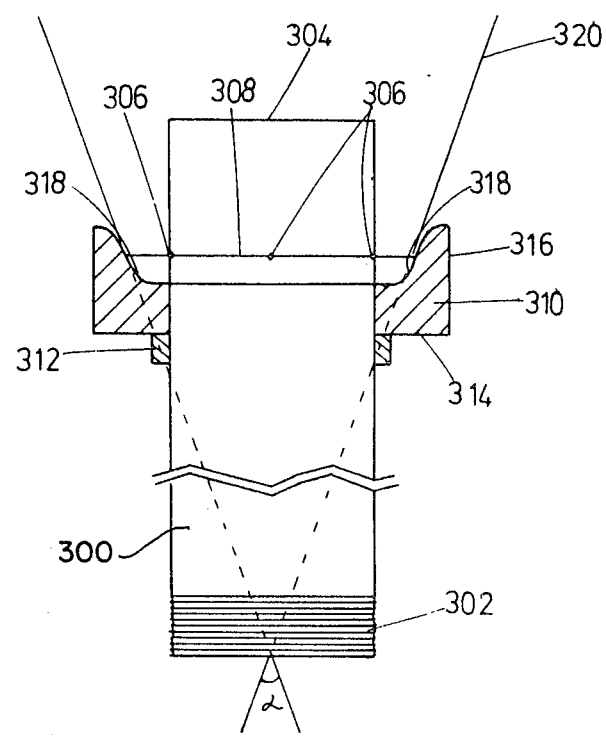
FIG. 8 is a schematic illustration of a spray head constructed and operative in accordance with an embodiment of the invention.

Reference is now made to FIG. 8 which illustrates a spray head constructed and operative in accordance with an embodiment of the invention and having particular utility in aerophonic applications. A water conduit 300, typically a generally cylindrical tube having a threaded inlet 302 and a sealed opposite end is formed with one or more water exit openings 306. In the preferred embodiment of the invention illustrated in FIG. 8, four such water exit openings are uniformly arranged about the periphery of conduit 300 in a single plane, which may be defined by a peripheral recess 308. A generally disc-shaped deflecting member 310, shown in section, is seated on conduit 300 at a selected position thereon determined by a support member 312, such as a frictional member or washer.

Deflecting member defines a generally flat portion 314 and a generally upstanding portion 316 which are joined by a curved inner surface 318. It may be appreciated that a liquid, such as water, exiting from openings 306 under pressure will impinge upon the inner surface 318. The precise positioning of member 310 is selected in accordance with the desired angle of surface 318 it is desired that the liquid flow impinge upon.

Thus if a relatively narrow spray is desired, i.e. defining a cone 320 of relatively small angle α, a member 310 is moved relatively upwards with respect to openings 306. If a wider spray is desired, member 310 is moved relatively downwards with respect to openings 306.

According to alternative embodiments of the invention, more or fewer openings 306 may be provided and the openings need not necessarily lie in the same plane. Furthermore the inner surface 318 of member 310 may be made in any desired configuration suitable for controlling the spray configuration.

Turning now to the automatic temperature and humidity control provided in accordance with an embodiment of the invention, reference is now made to FIG. 9. The control system will be described with reference to an aeroponic growing installation which comprises a plurality of growing enclosures, each referred to as sub-units. A plurality of sub-units are grouped together for spray control by a single time-sharing circuit and are considered as a unit. A plurality of such units may be interconnected with a single supply of nutrient solution in the overall system.

Each sub-unit is equipped with a dry thermometer and a wet thermometer (not shown) which together provide indications both of temperature and humidity. For each sub-unit, inputs from respective dry and wet thermometers are supplied to respective amplifiers 350 and 352, whose outputs are applied to respective positive and negative inputs of a comparator 354. The output of comparator 354 is supplied to a humidity recorder (not shown).

The output of amplifier 350 is supplied to a temperature recorder (not shown), to a heating threshold detector 356, which provides a nutrient tank heater control signal, and to a low-temperature threshold detector 358, which supplies an output signal to a spraying request OR-gate 360.

The output of comparator 354 is also supplied to a humidity threshold detector 362 which provides an output to OR-gate 360.

An oscillator 364 provides a clock input to a binary counter 366 having a Q5 output which determines the duration of spraying for a given sub-unit and a Q14 output which determines the interval between spraying cycles for a given sub-unit. The Q14 output of counter 366 is supplied to an input of OR-gate 360.

OR-gate 360 provides an output signal to a Restart AND gate 368, which also receives a start-condition input signal from time sharing circuitry 370, which will be described hereinafter and which is common for each unit. The output of AND-gate 368 is supplied via a diode 372 to the RESET input of binary counter 366, and is also supplied as a SET input to a Flip-Flop 374. Flip-Flop 374 also receives a RESET input from the Q5 output of counter 366 via a diode 376. A Power-On Reset signal supplied from circuitry 377 supplies a signal to the RESET input of counter 366 via a diode 378 and to the RESET input of Flip-Flop 374 via a diode 380. The output of Flip-Flop 374 is supplied to a sprayer control such as a solenoid valve or pump.

Each of the sub-units of the control system corresponding to sub-units of the growing apparatus are constructed substantially as described above. The output of Flip-Flop 374 of each sub-unit is supplied to a common bus 390 which is connected to the ENABLE input of a RESTART CONDITION shift register 392, which receives clock pulses from a RESTART oscillator 394. The three outputs of shift register 392 are supplied to Power On Reset circuitry 377 and to respective AND gates 368 as START CONDITION signals for the various sub-units. Bus 390 is connected also to a Pump Control Drive circuit 391.

The above description has dealt with a complete unit. A plurality of units may be constructed, each substantially as the unit described above and may be associated with a common solution measuring circuit or alternatively with corresponding individual solution measuring circuits depending on the nutrient supply configuration of the system.

The solution measuring circuit 400 comprises an oscillator 402 which provides an output to a solution conductivity measuring bridge 404. Bridge 404 provides output signals to respective positive and negative inputs of an amplifier 406 whose output is identified as a % Solution Test signal. The output of amplifier 406 is additionally supplied to a conductivity threshold circuit 408 which provides a % Solution Alarm signal, indicating a danger condition in the solution concentration.

The operation of the above-described circuitry will now be briefly summarized:

The purpose of the control circuitry is to provide the capability to vary the amounts of nutrients solution in the aeroponic growth environment according to the humidity and temperature prevailing in them. One aim is to prevent a situation in which the ambient humidity falls below a minimum threshold. When the humidity falls below this threshold spraying of the nutrient into the growth unit is activated subject to time sharing constraints. Similarly, temperature control is achieved by monitoring the ambient temperature. When an insufficiently high temperature is sensed, the frequency of spraying is increased with the resultant increase in relative humidity. When the ambient temperature in the growth environment reaches an even lower threshold, a thermostat-equipped heater located in a nutrient storage tank is operated to increase the heat of the nutrient spray and thus increase the temperature of the growth environment.

Spraying is commenced when a START CONDITION signal is provided. This occurs under one of the following conditions, (taken in the alternative):
1. Too low humidity
2. Too low temperature
3. The time interval between sprayings exceeds a given threshold.

The Start Condition signal is operative to enable reset of the binary counter 366, thus causing the Q14 output thereof to go to a Low state. The START CONDITION signal also enables Flip-Flop 374 to be Set which causes an enable signal to be sent to the Sprayer Control circuitry which results in a renewal of spraying. It may be appreciated that operation of the sprayers in any given sub-unit is dependent on that sub-unit being in START CONDITION as determined by the time sharing circuit. In the absence of exceedance of thresholds, normal timed operation determined by the setting of oscillator 364 and counter 366 continues. When a threshold condition occurs, spraying is recommenced earlier than would otherwise occur subject to time-sharing constraints.

Reference is now made to FIG. 10 which shows an alternative embodiment of control circuitry based on a microprocessor. An input analog multiplexer 450 receives various inputs from the various units and subunits of the growth apparatus, such as indications of temperature, humidity, nutrient supply and nutrient concentration as well as the conditions of the mains power and of a standby power source.

Multiplexer 450 communicates, as via a A/D converter 452, through a Data Bus, Address Bus and Control Bus with a microprocessor such as a M 6800 Based Microcomputer including Random Access memories and interchangeable ROMs. An output multiplexer/Latch and Execution Circuits 545 provides Alarm outputs and controls for pumps, heaters, fans, flow valves and relays as needed to operate the aeroponics sytem. The system is capable of automatically engaging standby power if necessary.

The composition of a nutrient mixture suitable for use in the aeroponics system of the present invention will now be discussed together with techniques for improving crop yields.

A concentrated stock solution is described hereinbelow for use, when diluted, preferably to a ratio of $1:5 \times 10^5$ in the aeroponics system described hereinabove. The solution has been found experimentally to be particularly suited for the growth and development of tomato plants. The solution contains constituents a and b which prior to dilution are kept in separate containers to prevent precipitation of essential ingredients thereof. According to a preferred embodiment of the invention the composition of the solution is as follows:

| a. | $Ca(NO_3)_2 \cdot 4H_2O$ | 29.50 Kg. |
|---|---|---|
|   | sequestren | 3.47 Kg. |
| b. | $KNO_3$ | 10.136 Kg. |
|   | $NH_4NO_3$ | 2.529 Kg. |
|   | $KH_2PO_4$ | 3.425 Kg. |
|   | $MgSO_4 \cdot 7H_2O$ | 12.665 Kg. |
|   | $ZnSO_4$ | 6.00 g. |
|   | $MnSO_4$ | 39.05 g. |
|   | $CuSO_4$ | 2.06 g. |
|   | $H_3BO_3$ | 74.00 g. |
|   | $MoO_3 \cdot H_2O$ | 0.42 g. |

Further in accordance with an embodiment of the invention there is provided a technique of increasing crop yields by applying to the plant once it has developed the potential capability to support the development and ripening of fruit a solution which serves to induce the initiation and development of flowers and fruit set.

In accordance with experiment it has been found helpful to provide, at initial stages of plant growth, the basic nutrient solution described above in a spray cycle of 20 minute duration separated by an interval of 10 minutes. After approximately one month of growth, or when two trusses of flowers are developed the solution is replaced by constituent b described above together with 0.1 gram of C.C.C. (2 chloroethyl)Trimethyl ammonium chloride to approximately 33 Kg. of constituent b.

Reference is now made to FIG. 11 which shows a plant growth unit constructed and operative in accordance with an alternative embodiment of the invention and in which a relatively low pressure high volume flow of air is employed as a propellent to produce a nutrient liquid spray. It is appreciated that while only a single growth unit is here illustrated, the apparatus is designed for a plurality of such growth units each operated by a central, common air compressor and control system, operative in response to environmental conditions in accordance with a predetermined program. A particular feature of the arrangment illustrated herein is that the liquid nutrient supply for each growth unit is isolated and does not mix with the nutrient supply for other growth units. This is important for the purpose of preventing the possible spread of disease and additionally for enabling different nutrient solutions to be used in different growth units belonging to the same system.

A growth unit 510 having supported hereon a plurality of plants 527, such that the root portions thereof are substantially exposed to the atmosphere has a drainage surface 536 which is coupled to a heating/pasteurization tank 537 via a conduit 538 which permits gravitational drainage of the nutrient liquid from surface 536 into tank 537.

A nutrient liquid spray is provided in the vicinity of the plant roots, indicated by reference numeral 525 by a plurality of spray heads 530. Spray heads 530 define nozzles designed to accomodate a relatively high volume, low pressure, e.g. 1 atm above atmospheric pressure flow of pressurized air, and are formed as a venturi with a side channel through which the liquid nutrient is drawn by the venturi effect of the air flow via a conduit 540 from a liquid nutrient supply line 542.

The relatively high volume air flow produces a relatively fine mist in the vicinity of the plant roots.

It may be appreciated that the liquid nutrient circulation system is a passive systme, other than for the pressurized air propulsion, and defines a closed system in which the liquid nutrient from one growth unit does not communicate with another growth unit. The pasteurization/heating tank 537 provides desired heating of the liquid nutrient. Where pasteurization is indicated for disease prevention or other purposes, the liquid nutrient is heated to an appropriate temperature. In such a case, the liquid nutrient may then be cooled to a desired degree with or without the use of an auxiliary holding tank or heat exchanger (not shown).

Where pasteurization is not required, the pasteurization/heating tank may be employed for selectably heating the liquid nutrient to provide temperature control of the root environment as described above in connection with the control systems of FIGS. 9 and 10.

The pasteurization/heating tank is governed by control circuitry 560 which may be control circuitry of the type described in either of FIGS. 9 and 10 or any other suitable control circuitry. Control circuitry recieves humidity and temperature inputs from respective sensors 562 and 564 inside each growth unit and from respective sensors 566 and 568 outside of the growth units. Depending on the instructions provided in advance to the control circuitry, it may operate both the heater and spray producing apparatus in response to one or more of these inputs in any combination. A predetermined timing program may be used additionally during all or part of a growth cycle.

The spray producing apparatus 570 typically comprises a pneumatic valve which selectively permits a flow of pressurized air from a compressor or a common air line to reach the spray heads 530. In order to reduce insofar as possible the required capacity of the air compressor, the control circuitry operates the spray producing apparatus associated with each control unit in a staggered arrangement as described hereinabove.

The periodicity of the nutrient sprays is determined by the estimated or actual dryness of the atmosphere in which the plants are situated. It is desired to suit the spray pattern to the rates of transpiration and evaporation of the plants. Wet and dry thermometers are employed to provide a spray pattern which is responsive both to temperature and to humidity. A typical exemplary spray pattern is indicated below:

| Measured Conditions | | Spray duration | Time between sprays |
|---|---|---|---|
| Temp. °C. | Rel. Hum. % | Seconds | Minutes |
| 0–10 | 75–100 | 40 | 5 |
| 10–15 | 75–100 | 40 | 10 |
| 15–20 | 75–100 | 40 | 20 |
| 20–30 | 75–100 | 40 | 60 |
| 30–40 | 40–75 | 40 | 10 |
| 30–40 | 0–40 | 40 | 5 |

Where the measured temperature is between 0° and 15° C., the liquid nutrient is maintained at about 30° C. for heating of the plant environment.

It is a particular feature of the invention that relatively frequent sprays are provided. The present invention may thus be contrasted with prior art spray systems in which the plant roots are at least partially enclosed in a liquid retaining medium and which do not involve frequent spraying.

It is a particular feature of the present invention that the spray pattern can be selectively and changeably controlled either by preprogramming or in response to currently measured environmental parameters or by any combination of the two.

The present invention is not limited to what has been specifically shown and described herein. Rather, the scope of the present invention is defined only by the claims which follow:

We claim:
1. Apparatus for growth and development of plants comprising: at least one plant development unit including:
an enclosure for enclosing the root portions of plants including substantially humidity retaining side and bottom walls;
a plant support member defining a generally flat top surface of said enclosure and including a layer of web material having apertures formed therein to receive plants above the root portions thereof without the provision of an intermediate element which surrounds a portion of the plant;
said plant support member being characterized in that it exposes substantially all of the root portions of the plants to the atmosphere contained within said enclosure;
nutrient spraying means for providing a nutrient mist enclosure, said nutrient comprising water and dissolved nitrogen and potassium fertilizers;
nutrient collection and recirculation means defined in part by a bottom surface of said enclosure;
control means for determining the timing of mist provision;
environmental sensor means for determining conditions affecting plant transpiration including temperature and humidity inside said enclosure;
means for heating said nutrient; and
control means for determining the timing of mist provision, said control means being responsive to the outputs of said environmental sensor means indicating temperature and humidity for maintaining a desired temperature and humidity within said enclosure;
wherein said spraying means comprises a centrally powered pneumatic system which draws liquid nutrient by venturi action; and
wherein the nutrient collection and recirculation means of each plant development unit is isolated from each other plant development unit.

2. Apparatus for aeroponic growth and development according to claim 1 and wherein said heating means is operative for pasteurizing the nutrient.

3. Apparatus according to claim 1 and wherein said pneumatic system operates at relatively low pressure.

4. A method for the aeroponic growth and development of plants comprising the steps of:
securing the plants above the root portions thereof in an enclosure including substantially humidity retaining side and bottom walls and forming part of at least one plant development unit so as to expose substantially all of the root portions thereof to the atmosphere within said enclosure; the securing step including placing plants in apertures formed in a layer of web material forming part of a plant support member defining a generally flat top surface of said enclosure without the provision of an intermediate element surrounding a portion of the plant;
sensing the temperatuer and humidity within said enclosure;
heating a liquid nutrient comprising dissolved fertilizers; and
providing a nutrient mist directly to the exposed root portions of said plants, said nutrient mist comprising said heated liquid nutrient;
said providing step including the steps of providing said nutrient mist at selected intervals in response to the sensed temperature and humidity in order to maintain a desired temperature and humidity in said enclosure,
said providing step also including the steps of providing an air flow; supplying a portion of said air flow to a venturi element; and drawing heated liquid nutrient by venturi action, said air flow being provided to a plurality of plant development units without permitting commlunication of said liquid nutrient between different plant development units.

* * * * *